(12) United States Patent
Aida et al.

(10) Patent No.: US 8,029,687 B2
(45) Date of Patent: Oct. 4, 2011

(54) POLISHING SLURRY, PRODUCTION METHOD OF GLASS SUBSTRATE FOR INFORMATION RECORDING MEDIUM AND PRODUCTION METHOD OF INFORMATION RECORDING MEDIUM

(75) Inventors: Katsuaki Aida, Ichihara (JP); Hiroyuki Machida, Ichihara (JP); Kazuyuki Haneda, Ichihara (JP)

(73) Assignee: Showa Denko K.K., Tokyo (JP)

( * ) Notice: Subject to any disclaimer, the term of this patent is extended or adjusted under 35 U.S.C. 154(b) by 936 days.

(21) Appl. No.: 11/661,269

(22) PCT Filed: Aug. 29, 2005

(86) PCT No.: PCT/JP2005/016154
§ 371 (c)(1),
(2), (4) Date: Feb. 27, 2007

(87) PCT Pub. No.: WO2006/025539
PCT Pub. Date: Mar. 9, 2006

(65) Prior Publication Data
US 2007/0256367 A1  Nov. 8, 2007

Related U.S. Application Data

(60) Provisional application No. 60/607,596, filed on Sep. 8, 2004.

(30) Foreign Application Priority Data

Aug. 30, 2004  (JP) ................................. 2004-250859
Apr. 18, 2005  (JP) ................................. 2005-119390

(51) Int. Cl.
*B44C 1/22*  (2006.01)
*C03C 15/00*  (2006.01)
*C03C 25/68*  (2006.01)
*H01L 21/302*  (2006.01)
*H01L 21/461*  (2006.01)

(52) U.S. Cl. ............... 216/38; 216/83; 216/89; 438/691

(58) Field of Classification Search ..................... 216/53
See application file for complete search history.

(56) References Cited

U.S. PATENT DOCUMENTS

| 6,312,487 B1 * | 11/2001 | Tanaka ........................... 51/309 |
| 2003/0017786 A1 | 1/2003 | Minamihaba et al. |
| 2006/0140105 A1 * | 6/2006 | Minami et al. ............. 369/272.1 |

FOREIGN PATENT DOCUMENTS

| JP | 2000-163740 A | | 6/2000 |
| JP | 2002-150548 A | | 5/2002 |
| JP | 2003-31529 A | | 1/2003 |
| JP | 2003031529 A | * | 1/2003 |
| JP | 2003-209076 A | | 7/2003 |
| JP | 2004-155914 A | | 6/2004 |

OTHER PUBLICATIONS

JP 2003-031529 Machine Translation Minami, Fukugaku Slurry for CMP, and Manufacturing Method of Semiconductor Device Using the Slurry.*
JP 2003-031529 Machine Translation.*
JP 1999-154325 machine translation.*
JP 2003-239076 machine translation.*

* cited by examiner

*Primary Examiner* — Nadine G Norton
*Assistant Examiner* — Stephanie Duclair
(74) *Attorney, Agent, or Firm* — Sughrue Mion, PLLC

(57) ABSTRACT

The present invention provides a low-cost polishing slurry having excellent effect with respect to defects and smoothness of the surface to be polished. The polishing slurry comprises a silica abrasive and a ceria abrasive, wherein the silica abrasive content is less than 3 mass % and the ceria abrasive content is less than 1 mass %, based on the entire polishing slurry. Further, the present invention provides a method for producing a crystallized glass substrate for an information recording medium, wherein the method use a polishing slurry of the present invention. Furthermore, the present invention provides a method for producing an information recording medium, comprising forming a recording layer on a crystallized glass substrate for an information recording medium obtained by the present method.

1 Claim, No Drawings

POLISHING SLURRY, PRODUCTION METHOD OF GLASS SUBSTRATE FOR INFORMATION RECORDING MEDIUM AND PRODUCTION METHOD OF INFORMATION RECORDING MEDIUM

CROSS REFERENCE TO RELATED APPLICATION

This application is an application filed under 35 U.S.C. §111(a) claiming benefit pursuant to 35 U.S.C. §119(e) of the filing date of Provisional Application 60/607,596, filed on Sep. 8, 2004, pursuant to 35 U.S.C. §111(b).

TECHNICAL FIELD

The present invention relates to a polishing slurry used for polishing a substrate, a production method of a glass substrate for an information recording medium, and a production method of an information recording medium.

RELATED ART

As for an information medium, a magnetic disc, a magneto-optical disc and an optical disc have been used. Among these, a magnetic disc is used as a high-capacity information recording medium. The substrate used for this magnetic disc is an aluminum alloy substrate or a glass substrate. In the case of using glass-substrate, as the substrate of a magnetic disc, hardness, surface smoothness, rigidity and impact resistance superior to those of an aluminum alloy substrate are generally ensured.

The glass substrate includes a chemically tempered glass substrate and a crystallized glass substrate, but a crystallized glass substrate has recently attracted attention because of its high hardness, high rigidity and high impact resistance. The crystallized glass substrate comprises a crystalline phase moiety and an amorphous phase moiety. Accordingly, in the polishing of the surface of the crystallized glass substrate, the relatively soft amorphous phase moiety is preferentially polished, the crystalline phase moiety tends to remain and, as a result, high surface smoothness cannot be obtained.

For example, in the case where ceria (cerium oxide: $CeO_2$) used in the precision polishing of an amorphous glass, such as chemically tempered glass, is used for the polishing of a crystallized glass, the polishing rate greatly differs between the relatively hard crystalline phase moiety and the relatively soft amorphous phase moiety, and the crystalline phase moiety remains to form fine protrusions or depressions on the polished surface, resulting in failure to obtain high smoothness.

Also, in the case of using an aluminum oxide as the abrasive, the abrasive grain is hard and has a strong activity in mechanical polishing and, therefore, microscratches may be generated on the polished surface of the substrate.

When a silica abrasive is used, the above-described problems are not caused and a polished surface having a small surface roughness Ra and less surface defects is obtained, but the silica abrasive is very low in the polishing rate and the processing efficiency is extremely poor.

In order to solve these problems, Japanese Unexamined Patent Publication (Kokai) No. 2002-150548 proposes to use an abrasive having a mechanochemical polishing activity on the amorphous phase moiety, such as ceria, in combination with an abrasive having a mechanical polishing activity mainly on the crystalline phase moiety, such as a silica abrasive. According to the polishing method of Japanese Unexamined Patent Publication (Kokai) No. 2002-150548, a glass substrate having high surface smoothness can be obtained at a high polishing rate.

In Japanese Unexamined Patent Publication (Kokai) No. 2002-150548, it is stated that if the content of the abrasive having a mechanical polishing activity on the crystalline phase moiety of the crystallized glass substrate is less than 3 mass %, surface defects called pits (depression defect) are generated on the glass substrate and this is not preferred. In Japanese Unexamined Patent Publication (Kokai) No. 2002-150548, it is also stated that if the content of the abrasive having a mechanochemical polishing activity on the amorphous phase moiety of the crystallized glass substrate is less than 1 mass %, the polishing rate disadvantageously decreases.

The method of Japanese Unexamined Patent Publication (Kokai) No. 2002-150548 has some effects on the polishing of a glass substrate, particularly a crystallized glass substrate. Accordingly, the present invention provides a polishing slurry useful for polishing a crystallized glass substrate at a lower cost. The present invention also provides a production method of a crystallized glass substrate with high surface smoothness for use in an information recording medium, and a production method of a high-performance information recording medium.

DISCLOSURE OF THE INVENTION

The present inventors have found that, contrary to expectation, when a silica abrasive and a ceria abrasive, each in a relatively low concentration, are combined, that is, when a silica abrasive of less than 3 mass % and a ceria abrasive of less than 1 mass % each based on the entire polishing slurry are combined, a polishing slurry having excellent effect with respect to defects and smoothness of the crystallized glass surface to be polished can be obtained. The present invention has been accomplished based on this finding. The present invention is as follows.

(1) A polishing slurry comprising a silica abrasive and a ceria abrasive, wherein the silica abrasive content is less than 3 mass % and the ceria abrasive content is less than 1 mass %, based on the entire polishing slurry.

(2) The polishing slurry as described in (1) above, wherein the silica abrasive is a colloidal silica.

(3) The polishing slurry as described in (1) above, wherein the silica abrasive content is from more than 0.4 mass % to less than 2 mass % based on the entire polishing slurry.

(4) The polishing slurry as described in (2) above, wherein the silica abrasive content is from more than 0.4 mass % to less than 2 mass % based on the entire polishing slurry.

(5) A method for producing a crystallized glass substrate for an information recording medium, comprising providing a polishing slurry between a polishing member and a surface of a crystallized glass substrate having at least on the surface thereof an amorphous phase moiety and a crystalline phase moiety, and effecting a relative motion between the glass substrate and the polishing member to polish the glass substrate, wherein the polishing slurry is the polishing slurry described in any one of (1) to (4) above.

(6) A crystallized glass substrate for an information recording medium, produced by the method described in (5) above.

(7) A method for producing an information recording medium, comprising forming a recording layer on a crystallized glass substrate for an information recording medium, which is obtained by the method described in (5) above.

(8) The method for producing an information recording medium as described in (7) above, wherein the recording layer is a magnetic layer.

BEST MODE FOR CARRYING OUT THE INVENTION

The polishing slurry of the present invention can be obtained by dispersing a ceria abrasive and a silica abrasive in a dispersion medium such as water.

The ceria abrasive usable for the polishing slurry of the present invention is generally available on the market and may have, for example, an average particle diameter of 0.1 to 5 μm, particularly from 0.2 to 1.5 μm.

The silica abrasive usable for the polishing slurry of the present invention is generally available on the market as, for example, fumed silica, precipitated silica or colloidal silica. Especially, colloidal silica may be used, and have, for example, an average particle diameter of 0.01 to 0.2 μm, particularly from 0.04 to 0.2 μm.

The dispersion medium usable for the polishing slurry of the present invention includes water and an organic solvent, for example, a water-soluble organic solvent. The dispersion medium is preferably water.

The polishing slurry of the present invention may arbitrarily contain a surfactant as a dispersant. Examples of this surfactant include an anionic surfactant, a cationic surfactant, a nonionic surfactant, an amphoteric ionic surfactant, and a combination thereof.

The polishing slurry of the present invention is useful particularly for the polishing of a crystallized glass substrate having a crystalline phase moiety and an amorphous phase moiety, because the ceria abrasive in the polishing slurry of the present invention chemically and mechanically acts to exert a good polishing activity on the amorphous phase moiety of the crystallized glass substrate and at the same time, the silica abrasive in the polishing slurry of the present invention mechanically acts to exert a good polishing activity even on the crystalline phase moiety where rapid polishing cannot be achieved by only the ceria abrasive. Furthermore, the polishing slurry of the present invention can exert good polishing performance by using the abrasives in a low concentration and therefore, the cost of the polishing slurry can be decreased.

For polishing a glass substrate by using the polishing slurry of the present invention, upper and lower platens each attached with a polishing cloth are used as the polishing member, a plurality of glass substrates held by a carrier are interposed between these polishing members, and the upper and lower platens are rotated, whereby both surfaces of the glass substrate can be simultaneously polished. The polishing slurry of the present invention can also be used for other polishing methods using a brush, a polishing tape, a polishing pad or the like.

The polishing step may be performed in one stage or by dividing it into a plurality of stages. In the case of performing the polishing step by dividing it into a plurality of stages, a coarse polishing step of removing the processing deteriorated layer and flaws on the glass substrate surface, and a final polishing step of smoothing the glass substrate surface and removing surface defects are generally performed.

A polishing pad (hard polisher) comprising a relatively hard urethane foam or the like is used as the polishing member in the coarse polishing step, and a polishing pad (soft polisher) comprising a relatively soft artificial suede or the like is used as the polishing member in the final polishing step. The present invention is not limited by the polishing member used in combination with the polishing slurry of the present invention for the polishing of a glass substrate. For example, an urethane pad, a non-woven pad, an epoxy resin pad and the like can be used as the hard polisher, and a suede pad, a non-woven pad and the like can be used as the soft polisher.

The surface of the crystallized glass substrate obtained by the production method of a crystallized glass substrate for an information recording medium of the present invention has fewer defects and a small roughness and, therefore, when a recording layer is formed on the crystallized glass substrate, an information recording medium capable of high-density recording, such as a magnetic disc, a magneto-optical disc and an optical disc, can be obtained.

Particularly, in the case of producing a magnetic disc by using a magnetic layer as the recording layer, by virtue of fewer defects and a small roughness on the surface of the glass substrate, the spacing between the magnetic head and the magnetic disc can be made very small and in turn, the recording density can be increased. As for the magnetic layer used here, any magnetic material can be used, but a Co alloy is generally used. Incidentally, as is generally well known, a seed layer, an underlayer and an intermediate layer can be provided between the glass substrate and the magnetic layer, and a protective layer and a lubricant layer can be provided on the magnetic layer.

EXAMPLES

Example 1

A ceria abrasive-containing solution (SHOROX, produced by Showa Denko K.K., average particle diameter: 0.5 μm) having a solid content of 12 mass %, and a silica abrasive solution (Compol, produced by Fujimi Incorporated, average particle diameter: 0.08 μm) were added to water to form a polishing slurry having a ceria content of 0.6 mass % and a silica content of 0.2 mass %. A polishing test was performed by using the obtained polishing slurry.

A substrate for a magnetic recording medium was produced by using a crystallized glass obtained from a raw material of $SiO_2$ 77%, $Li_2O$ 11%, $Al_2O_3$ 4% and MgO 3%.

In the production of this substrate for a magnetic recording medium, the raw material glass having the above-described composition was melted and mixed at a temperature of about 1,350 to 1,500° C. by using a melting apparatus, and the melt was press-shaped and then cooled to obtain a disc-shaped sheet glass having a diameter of 66 mmφ and a thickness of 1 mm. This sheet glass was heat-treated at 540° C. for about 5 hours to form crystal nuclei and then, crystal growth was allowed to proceed at a temperature of 780° C. for about 2 hours to obtain a crystallized glass. In this crystallized glass, the crystal phases were lithium disilicate and α-quartz, and particles resulting from aggregation of α-quartz were dispersed on the glass.

In the center of this sheet glass, a borehole was formed by using a cylindrical grindstone. Subsequently, the main surfaces of the substrate were subjected to a two-stage lapping process consisting of coarse lapping and precision lapping in a double-face polishing apparatus using diamond pellets, thereby adjusting the thickness and surface roughness of the substrate. Subsequently, the end face on the inner circumferential side facing the borehole of the substrate and the end face on the outer circumferential side were each chamfered with a grindstone by using an internal-external processing apparatus to form a chamfer.

The thus-processed glass substrate was processed for mirror polishing of respective end faces on the inner and outer circumferential sides. Subsequently, the main surfaces of the substrate were finally mirror-finished by using a double-face polishing apparatus (Model 16B, manufactured by SPEED-FAM Co., Ltd.). The polishing process was performed by two-stage polishing of coarse polishing and precision polishing.

In the coarse polishing, a cerium oxide powder-containing abrasive (ROX, produced by Showa Denko K.K.) was used as the abrasive, and a commercially available urethane pad was selected as the polishing pad. In the subsequent precision polishing, a cerium oxide powder-containing abrasive (ROX, produced by Showa Denko K.K.) and a colloidal silica-containing abrasive (Compol, produced by Fujimi Incorporated) were used as the abrasive, and a commercially available suede pad was selected as the polishing pad.

The obtained substrate was subjected to brush-scrub cleaning and subsequently to immersion cleaning using an ultrasonic wave in combination to remove deposits on the surface, and then dried with IPA (isopropyl alcohol) vapor to obtain a glass substrate for a magnetic recording medium. The surface roughness and surface defect of the thus-obtained substrate were evaluated.

The polishing performance of the polishing slurry was evaluated by the following items (1) to (3). The results are shown in Table 1 below.

(1) Polishing Rate

The polishing rate was determined from the change in mass of the disc between before and after polishing. Incidentally, the polishing rate is shown by a ratio to a polishing rate obtained by a polishing slurry containing 0.6 mass % of ceria and not containing colloidal silica (Comparative Example 7) and taken as 100.

(2) Disc Surface Roughness: Ra

The surface roughness Ra (Å) was evaluated by using an atomic force microscope (D3000, manufactured by Digital Instruments) with a visual field of 10 μm.

(3) Surface Defects

The surface defects were evaluated by using ODT (Optical Defect Tester) RZ3500 manufactured by Hitachi Electronics Engineering Co., Ltd. In this measuring apparatus, laser light is made perpendicularly incident on the disc surface and from the phase difference of reflected light, the defects are detected. The measurement parameters used for this measurement were a disc size of 65 mm, a measuring radius of 11 to 31.5 mm and a slice of ±0.01 μm.

In this evaluation by ODT, a protruded defect is shown by P (positive) and a depressed defect is shown by N (negative).

Accordingly, when P and N values are small, this means that the surface property of the disc is good.

Examples 2 to 5

A polishing test was performed in the same manner as in Example 1 except that the contents of ceria and silica abrasives were changed to the contents shown in Table 1. The results are shown in Table 1.

Comparative Examples 1 to 7 and Reference Example

A polishing test was performed in the same manner as in Example 1 except that the contents of ceria and silica abrasives were changed to the contents shown in Table 1. The results are shown in Table 1.

Evaluation Results

As apparent from Table 1, in Examples 1 to 5 where the silica abrasive content was from more than 0 mass % to less than 3 mass % and the ceria abrasive content was from more than 0 mass % to less than 1 mass %, good polishing effects were obtained similarly to Reference Example where the silica abrasive content and the ceria abrasive content both were high (corresponding to Japanese Unexamined Patent Publication (Kokai) No. 2002-150548).

On the other hand, in Comparative Examples 1 to 5 where the ceria abrasive content was low (or the ceria abrasive was not contained) and the silica abrasive content was high, the polishing rate was relatively low and the surface roughness Ra was large.

In Comparative Example 7 where the silica abrasive was not contained, the measured values by ODT were large and this reveals that many surface defects were present.

TABLE 1

Slurry Composition and Experimental Results

| | Contents (mass %) | | Polishing | ODT Results | | |
|---|---|---|---|---|---|---|
| | Ceria | Colloidal Silica | Rate | P | N | Ra |
| Ex. 1 | 0.6 | 0.2 | 96 | 12 | 11 | 3.3 |
| Ex. 2 | 0.6 | 0.4 | 76 | 17 | 22 | 3.7 |
| Ex. 3 | 0.6 | 0.8 | 56 | 19 | 18 | 3.6 |
| Ex. 4 | 0.6 | 1.2 | 60 | 22 | 18 | 3.9 |
| Ex. 5 | 0.6 | 2.0 | 76 | 7 | 16 | 4.3 |
| Comp. Ex. 1 | 0.6 | 8.0 | 44 | 22 | 9 | 5.6 |
| Comp. Ex. 2 | 0.4 | 8.0 | 40 | 7 | 14 | 4.4 |
| Comp. Ex. 3 | 0.06 | 8.0 | 26 | 12 | 5 | 6.5 |
| Comp. Ex. 4 | 0.01 | 8.0 | 29 | 5 | 2 | 8.0 |
| Comp. Ex. 5 | 0.0 | 8.0 | 30 | 12 | 7 | 12.4 |
| Comp. Ex. 6 | 9.4 | 1.6 | 82.5 | 20 | 15 | 3.6 |
| Comp. Ex. 7 | 0.6 | 0.0 | 100 | 85 | 73 | 3.9 |
| Ref. Ex | 9.0 | 4.5 | 65.5 | 20 | 15 | 3.7 |

Thereafter, the obtained substrate was subjected to a texturing treatment with the use of a diamond slurry and a non-woven fabric and then mounted on a sputtering apparatus, and an under film consisting of a chromium alloy and a magnetic film consisting of a cobalt alloy were formed on both surfaces of the substrate by sputtering. Furthermore, a diamond-like carbon film was formed thereon by the CVD process and on this film, Fonblin Z-Tetraol (produced by Solvay Solexis) as a lubricant was coated to produce a magnetic recording medium. The total thickness of the films formed by sputtering was 90 nm, and the thickness of the film formed by CVD was 10 nm. In this way, 25 magnetic recording mediums were produced from the discs obtained in Examples 1 to 5 and the Reference Example.

The surface defect of these magnetic recording mediums was evaluated by using a Media Defect Evaluating Apparatus manufactured by Hitachi High-Technologies Corporation. The evaluation results revealed that the defect level of Examples 1 to 5 was similar to that of the Reference Example.

The invention claimed is:
1. A method for producing a crystallized glass substrate for an information recording medium, comprising
providing a polishing slurry between a polishing member and a surface of a crystallized glass substrate having at least on the surface thereof an amorphous phase moiety and a crystalline phase moiety, and effecting a relative motion between the glass substrate and the polishing member to polish the glass substrate, wherein the polishing slurry comprises a silica abrasive and a ceria abrasive, wherein the silica abrasive content is 0.2 mass % or more to less than 2 mass % and the ceria abrasive content is 0.6 mass % or more to less than 1 mass %, based on the entire polishing slurry.

* * * * *